Figure 1:
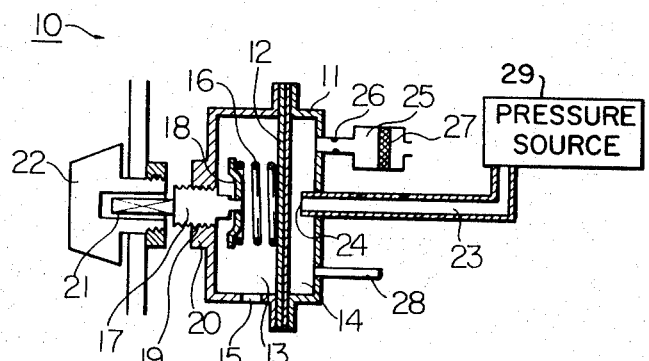

United States Patent [19]

Mohri

[11] 3,761,017

[45] Sept. 25, 1973

[54] TEMPERATURE SENSITIVE PRESSURE REGULATOR
[75] Inventor: Yohichi Mohri, Tsurumi-ku, Yokohama, Japan
[73] Assignee: Nissan Motor Company, Limited, Yokohama City, Japan
[22] Filed: Apr. 20, 1971
[21] Appl. No.: 135,631

[30] Foreign Application Priority Data
Apr. 24, 1970  Japan.............................. 45/35286

[52] U.S. Cl............................. 236/87, 237/12.3 A
[51] Int. Cl. ......................................... G05d 23/275
[58] Field of Search......................... 236/85, 87, 92; 237/12.3 A

[56] References Cited
UNITED STATES PATENTS
1,558,081  10/1925  Gano et al. ........................ 236/92 R Primary Examiner—William E. Wayner
Attorney—McCarthy, Depaoli & O'Brien

[57] ABSTRACT

A temperature sensitive pressure regulator adapted to provide a temperature dependent pressure without being affected by variations in a source pressure. The pressure regulator comprises an airtight housing divided by a bimetallic partition into a first chamber and a second chamber. The first chamber is held at atmospheric pressure through an air vent. Instead of the first chamber only a support for an adjustment device may be used. A coiled spring is provided for urging the partition wall toward the second chamber. A conduit leading from a pressure source opens to the second chamber at a suitable spacing from the partition wall with the port of the conduit facing the partition wall. Another conduit is provided for communicating the second chamber with a pressure controlled device. Means are provided for selectively introducing atmospheric air into the second chamber. The bimetallic partition wall is responsive to the pressure difference between the first and second chambers as well as the surrounding temperature to be movable toward the facing port of the conduit tending to close it.

9 Claims, 2 Drawing Figures

3,761,017

INVENTOR
Yohichi Mohri
BY
McCarthy, Depaoli, O'Brien & Price
ATTORNEY

TEMPERATURE SENSITIVE PRESSURE REGULATOR

This invention relates to a temperature sensitive pressure regulator including a spring-loaded bimetal and in which the regulated pressure is fed back to the bimetal to compensate for variations in the pressure of a pressure source. The pneumatic pressure regulator of this type can provide a temperature dependent pressure to a pressure operated device without being affected by variations in the source pressure. For example, such a temperature sensitive pressure regulator can be used with an automotive heating apparatus to control the opening of a damper by regulating the pressure transmitted to a damper operating diaphragm device.

It is an object of this invention to provide a novel temperature sensitive pressure regulator including a spring-loaded bimetal and capable of producing a temperature dependent pressure in spite of variations in the source pressure.

It is another object of this invention to provide a temperature sensitive pressure regulator for use with an automotive heating device which can control the opening of a damper in accordance with the temperature of the passenger compartment.

It is a further object of this invention to provide a temperature sensitive pressure regulator which is simple to construct, reliable in operation and durable in use.

Figure 2:
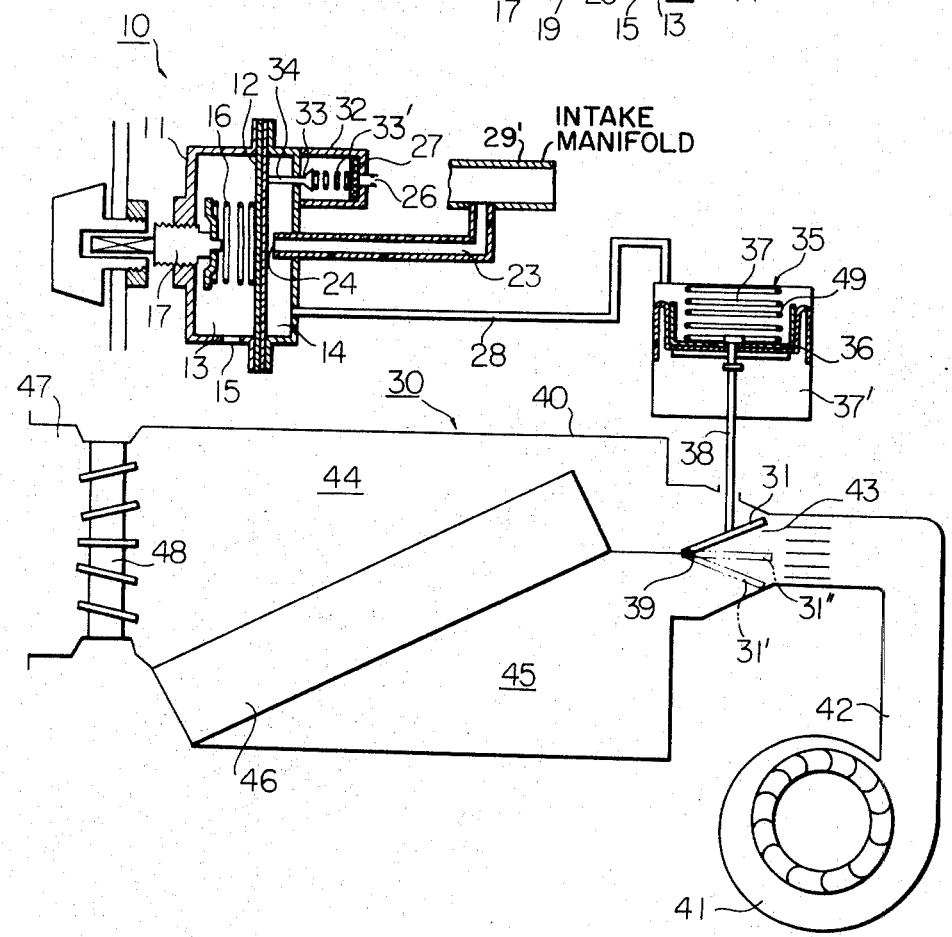

In the accompanying drawings:

FIG. 1 is a longitudinal section of a temperature sensitive pressure regulator embodying this invention; and FIG. 2 is a diagrammatic illustration of the present temperature sensitive pressure regulator as used with an automotive heating apparatus to control the damper mechanism.

Referring to FIG. 1, the temperature sensitive pressure regulator 10 comprises a housing 11 which includes a bimetallic member or partition wall 12 securely mounted therein. The bimetallic partition wall 12 divides the interior of the housing 11 into a first chamber 13 and a second chamber 14 (which will be hereinafter referred to as "atmospheric chamber" and "pressure regulating chamber", respectively). The atmospheric chamber 13 is at all times held at atmospheric pressure by a vent port 15. The vent 15 is suitably selected to provide a good communication between the inside and outside of chamber 13. A coiled spring 16 is provided within the chamber 13 to normally urge the bimetallic partition 12 toward the pressure regulating chamber 14. The force of compression of the coiled spring 16 can be adjusted by an adjustment device such as a screw 17 carrying thereon a spring support 18 for the coiled spring 16. The adjustment screw 17 may be threaded and disposed in a correspondingly threaded hole 19 provided in a projection 20 extending outwardly from the housing 11 or disposed in a bore by other means. The adjustment screw 17 also has a polygonally sectioned end 21 for fixedly mounting a knob 22 thereon.

The first chamber may be reduced to a simple support for the adjustment device in which case the bimetallic member 12 rapidly responds to the ambient temperature variations.

A first conduit 23 leading from a pressure source (not shown) extends through the housing 11 and opens to the pressure regulating chamber 14 at a position suitably spaced from the bimetallic partition wall 12. In this instance, it is important that the outlet port 24 of the conduit 23 faces the bimetallic partition wall 12 substantially centrally thereof. Further, the spacing therebetween is critical to the proper functioning of the present device. Flow restriction means are provided for introducing atmospheric air or other media into or out of the pressure regulating chamber 14 and comprise chamber 25, a small orifice 26 provided between the chamber 25 and the pressure regulating chamber 14 and filter 27 provided within the chamber 25. A second conduit 28 is also connected to the pressure regulating chamber 14 to transmit the regulated pressure to a pressure controlled device (not shown). With this arrangement, the bimetallic partition wall 12 is responsive to the regulated pressure as well as to the surrounding temperature. This means that the regulated pressure is fed back to the bimetal 12 to act on it.

Now, assuming that the surrounding temperature remains at a substantially constant value, the bimetal 12 is liable to distend depending upon ambient temperature and the pressure difference between the atmospheric chamber 13 and the pressure regulating chamber 14. If vacuum negative pressure is admitted into the pressure regulating chamber 14, via conduit 23, the bimetallic partition wall 12 is subjected to a rightward force as viewed in FIG. 1 and moves toward the end of the conduit 23 as the vacuum increases. This will tend to close the facing port 24 to block the communication bewtween a vacuum source (not shown) and the pressure regulating chamber 14 thereby preventing any further increase in the vacuum present in the chamber 14. The atmospheric air is at all times admitted into the pressure regulating chamber 14 through the chamber 25. Thus, after closure of the port 24 of the conduit 23, a small amount of air is bled through the orifice 26 continuously and the vacuum in the pressure regulating chamber 14 gradually decreases. As the vacuum decreases to a certain value, the bimetallic partition wall 12 moves away from the facing port 24, reestablishing the communication between the pressure regulating chamber 14 and the vacuum source 29. This will again raise the vacuum in the pressure regulating chamber 14. Thus, it will be understood that the vacuum in the pressure regulating chamber 14 is automatically maintained at a certain value by the movement of the bimetallic partition wall 12, regardless of variation in the pressure of the pressure source.

If, at this time, the surrounding temperature varies, the bimetallic partition wall 12 distends to a position in which the forces fof the coiled spring and the bimetallic partition wall itself and the pressure difference between the two chambers 13 and 14 are balanced, so that the pressure in the pressure regulating chamber 14 is varied accordingly. Further, the temperature dependent pressure can be adjusted by manually rotating the knob 22 so as to vary the force of compression of the coiled spring 16.

FIG. 2 illustrates the present temperature sensitive pressure regulator 10 as used with an automotive heating apparatus 30 to control the opening of the damper 31. The pressure regulator 10 as illustrated is substantially similar to that of FIG. 1 except that the atmospheric air introducing means 32 is differently constructed in that the atmospheric air introducing means 32 includes a cut-off valve 33 having a spring 33' which valve is operatively associated with the bimetallic partition 12 by means of a rod 34 in such a manner that the valve 33 is closed when the partition 12 is in the position remotest from the facing outlet port 24 of the conduit 23 due to low surrounding temperatures. The present pressure regulator 10 is positioned in such a location that the bimetallic partition 12 may sense the temperature of the passenger compartment (not shown).

The conduit 23 is connected to the intake 29' of an internal combustion engine to admit vacuum or negative pressure therein into the pressure regulating chamber 14. A damper operating means 35 comprises a spring-loaded diaphragm 36 the spring side negative pressure chamber 37 of which is communicated through the conduit 28 to the pressure regulating chamber 14. An atmospheric chamber 37' is vented to air. The diaphragm 36 has secured thereto an operating rod 38 which is attached to the damper 31. The damper 31 in turn is pivotally mounted on a pin 39 provided in a housing 40 for the heating apparatus 30. Thus, movements of the diaphragm 36 as the vacuum in the pressure regulating chamber 14 varies results in the swinging movement of the damper 31 about the pin 39.

The automotive heating apparatus 30 as shown includes an air blower 41 which is connected through a duct 42 to the air inlet 43 of the housing 40. Adjacent the inlet 43 is the damper 31 which is adapted to swing about the pin 39 so as to selectively direct the flow of air delivered by the air blower 41 to the two compartments 44 and 45 of the housing 40. A heating means 46 such as a radiator through which hot water from the engine cooling system is circulated is provided between the two compartments 44 and 45 to heat air passing through the heating means 46. An air outlet 47 is provided in the housing 40 so as to communicate the compartment 44 with the passenger compartment. A louver 48 comprising a plurality of differently oriented fins or vanes is provided adjacent the outlet port 47 so that a substantially even flow of air is discharged into all parts of the passenger compartment.

In operation, when the temperature in the passenger compartment is so low that the bimetallic partition 12 is positioned away from the facing outlet port 24 of the conduit 23, allowing the vacuum in the intake manifold to enter the vacuum or spring side 37 of the diaphragm device 35. The vacuum thus entering the diaphragm device 35 acts on the diaphragm 36 moving it upward against the action of a spring 49. This upward movement swings the damper 31 in a counter-clockwise direction to the upper extreme position as indicated by the damper drawn in solid lines. In this position all the flow of air delivered from the air blower 41, when switched on, is introduced to the compartment 45. The air flow thus introduced into the compartment 45 is then heated by the heating means 46 while passing therethrough. Finally, the heated air is discharged through the louver 48 into the passenger compartment.

As the passenger compartment becomes increasingly warm, the bimetallic partition wall 12 will move toward the outlet end of the conduit 23, tending to close the facing outlet port 24 and concurrently to open the cut-off valve 33 of the atmospheric air introducing means 32. Upon opening of the cut-off valve 33, the atmospheric air starts entering through the small orifice 26 and the air filter 27 into the pressure regulating compartment 14 to decrease the vacuum therein. Thus, the diaphragm 12 is moved downward by the action of the coiled spring 49, causing the damper 31 to rotate in a clockwise direction to the position as indicated by reference numeral 31'. In this position, the flow of air fed by the air blower 41 is totally directed to the compartment 44 and therefore it is discharged into the passenger compartment without being heated by the heating means 46.

In some instances, the damper 31 may be held in the position as indicated by 31'' which is located between the two extreme positions 31 and 31'. In this position, the flow of air from the air blower 41 is divided into two portions, one of which entering the compartment 45 is heated and the other one is not heated, which are mixed by the vanes of the louver 48 and then discharged into the passenger compartment.

Although the pressure regulator according to this invention has been shown and described as employing a vacuum as the source pressure, it should be understood that the present device could be easily modified by those skilled in the art so as to be operated by pressurized air or other pressurized media such as fluids without departing from the proper scope of the invention.

As has been described above, this invention provides a novel pressure regulator that is capable of controlling the pressure responsively to the ambient temperature without being affected by variations in the pressure of a pressure source.

What is claimed is:

1. A temperature sensitive pressure regulator comprising, a temperature responsive bimetallic partition provided within an airtight housing dividing the interior thereof into a first chamber and a second chamber, an air vent for providing communication between said first chamber and the atmosphere, a first conduit leading from a pressure source and having its outlet port opening to said second chamber in a position suitably spaced from said partition with said port facing said partition, a second conduit connecting said second chamber with a pressure controlled device, flow restricting means for bleeding continuously atmospheric air into said second chamber, said bimetallic partition being also responsive to a pressure difference between said first chamber and said second chamber as well as the surrounding temperature to be distended toward said outlet port of said first conduit to close it, whereby a temperature dependent pressure is supplied to the pressure controlled device without being affected by variations in the pressure of said pressure source.

2. A temperature sensitive pressure regulator according to claim 1, in which said flow restricting means for bleeding continuously atmospheric air into said second chamber comprises a casing forming an air chamber, a constriction provided between said air chamber and said second chamber, and a air filter mounted within said air chamber.

3. A temperature sensitive pressure regulator according to claim 1, further comprising a spring for urging said bimetallic partition toward said second chamber to balance the force of said bimetallic partition with the force of said spring.

4. A temperature sensitive pressure regulator according to claim 3, in which the force of compression of said spring is adapted to be adjustable by an adjustment screw having said spring carried thereon by means of a spring support, said adjustment screw being mounted within a bore.

5. A temperature sensitive pressure regulator according to claim 4, in which said adjustment device is of screw type, said has a polygonally sectioned end for fixedly mounting a knob thereon.

6. A temperature sensitive pressure regulator according to claim 1, in which said pressure source comprises the intake manifold of an internal combustion engine of a vehicle and said pressure controlled device comprises a diaphragm device adapted to control the opening of a damper of an automotive heating apparatus.

7. A temperature sensitive pressure regulator according to claim 6, wherein said diaphragm device comprises a diaphragm dividing a housing into a negative pressure chamber and an atmospheric chamber, a spring mounted in the negative pressure chamber to oppose the action of negative pressure introduced into said negative pressure chamber and a slidable damper operating rod secured at one end to said diaphragm, the other end of said rod being connected to said damper to change the position of said damper in dependence on the pressure in the negative pressure chamber.

8. A temperature sensitive pressure regulator according to claim 1, wherein said first chamber is reduced to a support for said adjustment device of said screw, whereby said bimetallic member responds rapidly to temperature variations of said ambient matter.

9. A temperature sensitive pressure regulator according to claim 1, wherein said pressure source is a source of pressurized fluid.

* * * * *